(12) United States Patent
Shalen

(10) Patent No.: US 8,712,891 B1
(45) Date of Patent: Apr. 29, 2014

(54) METHODS AND SYSTEMS FOR CREATING A TAIL RISK HEDGE INDEX AND TRADING DERIVATIVE PRODUCTS BASED THEREON

(75) Inventor: Catherine T. Shalen, Chicago, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 0 days.

(21) Appl. No.: 13/560,308

(22) Filed: Jul. 27, 2012

Related U.S. Application Data

(60) Provisional application No. 61/512,850, filed on Jul. 28, 2011.

(51) Int. Cl.
*G06Q 40/00* (2012.01)
(52) U.S. Cl.
USPC .......................................... 705/35; 705/36 R
(58) Field of Classification Search
USPC ....................................................... 705/35–45
See application file for complete search history.

(56) References Cited

U.S. PATENT DOCUMENTS 8,335,735 B1 * 12/2012 Chafkin et al. ............. 705/36 R

FOREIGN PATENT DOCUMENTS

WO    WO02/077760    * 10/2002

OTHER PUBLICATIONS

VIX Futures and Options—A Cast Study of Portfolio Diversification During the 2008 Financial Crises, Edward Szado, CFA[1], Aug. 2009 (31 pages).

* cited by examiner

*Primary Examiner* — Richard C Weisberger
(74) *Attorney, Agent, or Firm* — Brinks Gilson & Lione

(57) ABSTRACT

A method and system for calculating a tail risk hedge index is disclosed where the tail risk hedge index is associated with a portfolio having an underlying asset and a volatility index option based on the underlying asset. The method includes, with a processor in a trading platform, calculating a tail risk hedge index (VXTH) associated with the portfolio having an underlying asset and a volatility index (VIX) option based on the underlying asset, and displaying the VXTH. The VXTH is calculated by compounding its value based on the equation: $VXTH_t = VXTH_{t-1} * (1 + R_{VXTH})$, where t is the close date and $R_{VXTH}$ is the daily net rate of return of the index. A trading platform for creating and disseminating the index, and for creating and trading a derivative based on the index, is also disclosed.

19 Claims, 6 Drawing Sheets

METHODS AND SYSTEMS FOR CREATING A TAIL RISK HEDGE INDEX AND TRADING DERIVATIVE PRODUCTS BASED THEREON

CROSS-REFERENCE TO RELATED APPLICATIONS

This application claims the benefit of U.S. Provisional App. No. 61/512,850, filed Jul. 28, 2011, the entirety of which is hereby incorporated herein by reference.

TECHNICAL FIELD

The present disclosure relates to derivative investment markets. More specifically, the present disclosure relates to electronically creating and disseminating one or more volatility indices calculated using a hypothetical portfolio of a volatility index derivative and another underlying asset, and facilitating the electronic creation and trading of derivative products based on this index.

BACKGROUND

A derivative is a financial instrument valued, at least in part, on the value and/or characteristic(s) of another security, known as an underlying asset. Examples of underlying assets include, but are not limited to: financial instruments (e.g., bonds, interest rate swaps, and interest rate swaptions), commodities, securities, electronically traded funds, and indices. Two exemplary and well known derivatives are options and futures contracts.

Derivatives, such as options and futures contracts, may be traded over-the-counter and/or on other trading platforms, such as organized exchanges (e.g., the Chicago Board Options Exchange, Incorporated ("CBOE")). In over-the-counter transactions the individual parties to a transaction are able to customize each transaction to meet each party's individual needs. With trading platform or exchange traded derivatives, buy and sell orders for standardized derivative contracts are submitted to an exchange where they are matched and executed. Generally, modern trading exchanges have exchange specific computer systems that allow for the electronic submission of orders via electronic communication networks, such as the Internet.

Once matched and executed, the executed trade is transmitted to a clearing corporation that stands between the holders and writers of derivative contracts. When exchange traded derivatives are exercised, the cash or underlying assets are delivered, when necessary, to the clearing corporation and the clearing corporation disperses the assets as appropriate and defined by the consequence(s) of the trades.

An option contract gives the contract holder a right, but not an obligation, to buy or sell an underlying asset at a specific price on or before a certain date, depending on the option style (e.g., American or European). Conversely, an option contract obligates the seller of the contract to deliver an underlying asset at a specific price on or before a certain date, depending on the option style (e.g., American or European). An American style option may be exercised at any time prior to its expiration. A European style option may be exercised only at its expiration, i.e., at a single pre-defined point in time.

There are generally two types of options: calls and puts. A call option conveys to the holder a right to purchase an underlying asset at a specific price (i.e., the strike price), and obligates the writer to deliver the underlying asset to the holder at the strike price. A put option conveys to the holder a right to sell an underlying asset at a specific price (i.e., the strike price), and obligates the writer to purchase the underlying asset at the strike price.

There are generally two types of settlement processes: physical settlement and cash settlement. During physical settlement, funds are transferred from one party to another in exchange for the delivery of the underlying asset. During cash settlement, funds are delivered from one party to another according to a calculation that incorporates data concerning the underlying asset.

A futures contract gives a buyer of the future an obligation to receive delivery of an underlying commodity or asset on a fixed date in the future. Accordingly, a seller of the future contract has the obligation to deliver the commodity or asset on the specified date for a given price. Futures may be settled using physical or cash settlement. Both options and futures contracts may be based on abstract market indicators, such as indices.

An index is a statistical composite that is used to indicate the performance of a market or a market sector over various time periods and may thus act as a performance benchmark. Examples of indices include the Dow Jones Industrial Average, the National Association of Securities Dealers Automated Quotations ("NASDAQ") Composite Index, and the Standard & Poor's 500 ("S&P 500"). As noted above, options on indices are generally cash settled. For example, using cash settlement, a holder of an index call option receives the right to purchase not the index itself, but rather a cash amount equal to the value of the index multiplied by a multiplier, e.g., $100. Thus, if a holder of an index call option exercises the option, the writer of the option must pay the holder, provided the option is in-the-money, the difference between the current value of the underlying index and the strike price multiplied by a multiplier.

Among the indices that derivatives may be based on are those that gauge the volatility of a market or a market subsection. For example, OBOE created and disseminates the OBOE Market Volatility Index or VIX®, which is a key measure of market expectations of near-term volatility conveyed by S&P 500 stock index options prices. Additionally, OBOE offers exchange traded derivative products (both futures and options) that use the VIX as the underlying asset. Volatility indices and the derivative products based thereon have been widely accepted by the financial industry as both a useful tool to hedge positions and as a device for expressing investment views on the direction of volatility. While several volatility indices exist, no standardized benchmarks exist to hedge against tail risk over a given investment horizon.

BRIEF SUMMARY

Accordingly, the present disclosure relates to methods and systems for creating and disseminating a volatility overlay index based on a hypothetical underlying portfolio.

In one aspect, a computer-implemented method of creating a tail risk hedge index derivative is disclosed. The method includes accessing a tail risk hedge index associated with a portfolio of an underlying asset and a volatility index derivative and creating, with a processor, a tail risk hedge index derivative based on the tail risk hedge index. The method further includes transmitting, with the processor, information associated with the tail risk hedge index derivative for display.

In another aspect, a computer-implemented method of calculating a tail risk hedge index is disclosed where the tail risk hedge index is associated with a portfolio having an underlying asset and a volatility index option based on the underlying asset. The method includes, with a processor in a trading platform, calculating a tail risk hedge index (VXTH) associated with the portfolio having an underlying asset and a volatility index option based on the underlying asset, and displaying the VXTH. The VXTH is calculated by compounding its value based on an equation: $VXTH_t = VXTH_{t-1} * (1+R_{VXTH})$, where t is the close date and $R_{VXTH}$ is the daily net rate of return of the index. A trading platform for generating the tail risk hedge index and creating and trading derivatives based on this index is also disclosed.

DETAILED DESCRIPTION OF THE PREFERRED EMBODIMENTS

Figure 1:
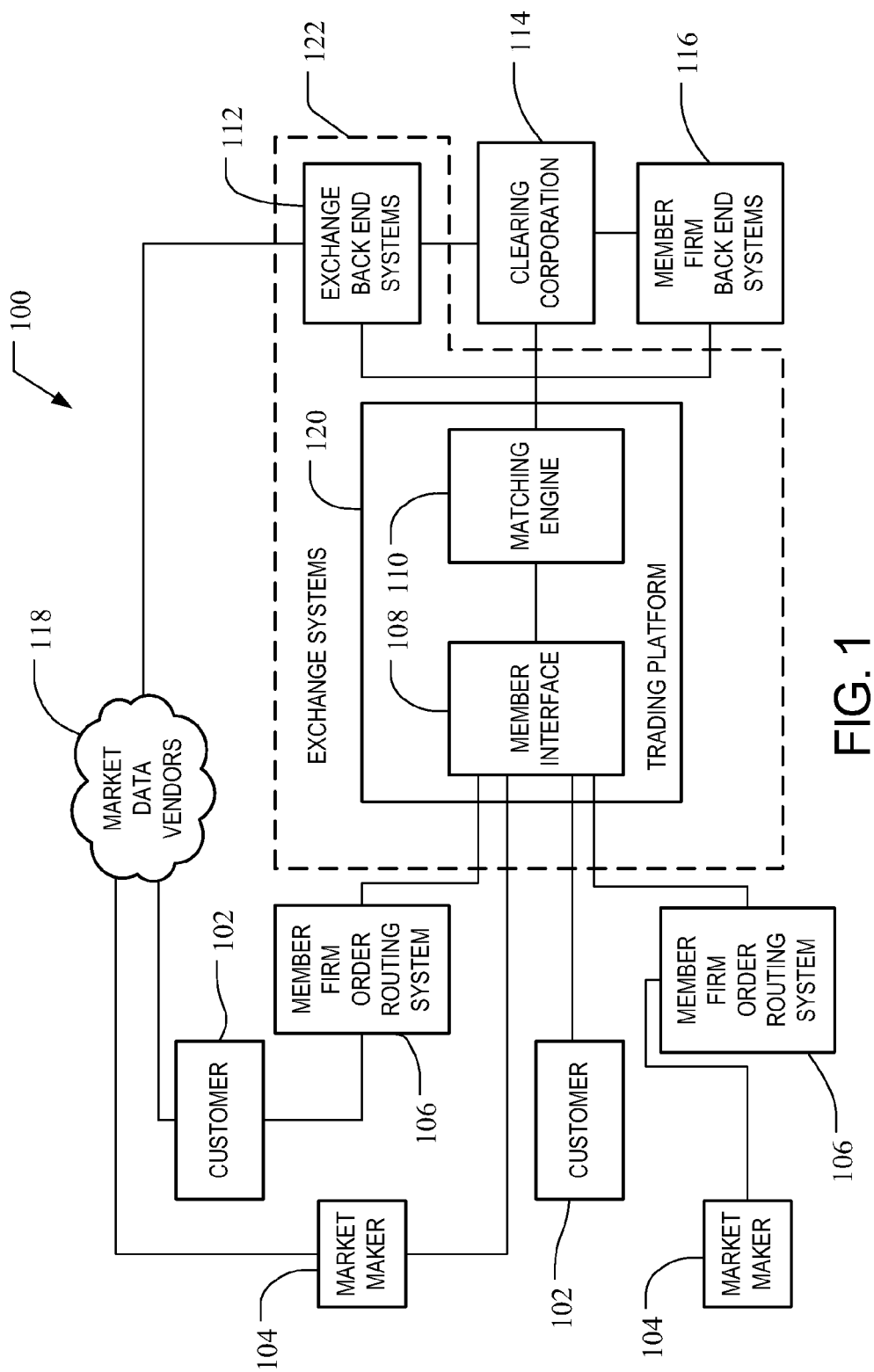
FIG. 1 is a diagram of a financial exchange's computerized trading system.

FIG. 1 illustrates an electronic trading system 100 which may be used for creating and disseminating a volatility overlay index (such as described below) and/or creating, listing and trading derivative contracts that are based on a volatility overlay index. One having ordinary skill in the art would readily understand that system 100, as described in detail below, would be implemented utilizing a combination of computer hardware and software, as described in the paragraph above. It will be appreciated that the described systems may implement the methods described below.

The system 100 includes components operated by an exchange, as well as components operated by others who access the exchange to execute trades. The components shown within the dashed lines are those operated by the exchange. Components outside the dashed lines are operated by others, but nonetheless are necessary for the operation of a functioning exchange. The exchange components 122 of the trading system 100 include an electronic trading platform 120, a member interface 108, a matching engine 110, and backend systems 112. In one embodiment, the methods described herein may be executed on any one or more of the exchange components 122. As will be understood by one of ordinary skill in the art, the particular combination of exchange components is not limiting and other combinations of exchange components are also contemplated. Backend systems not operated by the exchange but which are integral to processing trades and settling contracts are the Clearing Corporation's systems 114, and Member Firms' backend systems 116.

Market Makers may access the electronic trading platform 120 directly through personal input devices 104 which communicate with the member interface 108. Market makers may quote prices for the derivative contracts described herein. Non-member Customers 102, however, must access the exchange through a Member Firm. Customer orders are routed through Member Firm routing systems 106. The Member Firm routing systems 106 forward the orders to the exchange via the member interface 108. The member interface 108 manages all communications between the Member Firm routing systems 106 and Market Makers' personal input devices 104, determines whether orders may be processed by the trading platform, and determines the appropriate matching engine for processing the orders.

Although only a single matching engine 110 is shown in system 100, the trading platform 120 may include multiple matching engines. Different exchange traded products may be allocated to different matching engines for efficient execution of trades. When the member interface 102 receives an order from a Member Firm routing system 106, the member interface 108 determines the proper matching engine 110 for processing the order and forwards the order to the appropriate matching engine. The matching engine 110 executes trades by pairing corresponding marketable buy/sell orders. Non-marketable orders are placed in an electronic order book.

Once orders are executed, the matching engine 110 sends details of the executed transactions to the exchange backend systems 112, to the Clearing Corporation systems 114, and to the Member Firm backend systems 116. The matching engine also updates the order book to reflect changes in the market based on the executed transactions. Orders that previously were not marketable may become marketable due to changes in the market. If so, the matching engine 110 executes these orders as well.

The exchange backend systems 112 perform a number of different functions. For example, contract definition and listing data originate with the Exchange backend systems 112. The volatility overlay indices described below, and pricing information for derivative contracts associated with these indices are disseminated from the exchange backend systems to market data vendors 118. Customers 102, market makers 104, and others may access the market data regarding the indices and the derivative contracts based on the indices via, for example, proprietary networks, on-line services, and the like.

The exchange backend systems also evaluate the underlying asset or assets on which the derivative contracts relating to the volatility overlay indices are based. At expiration, the backend systems 112 determine the appropriate settlement amounts and supply final settlement data to the Clearing Corporation 114. The Clearing Corporation 114 acts as the exchange's bank and performs a final mark-to-market on Member Firm margin accounts based on the positions taken by the Member Firms' customers. The final mark-to-market reflects the final settlement amounts for the derivative contracts of the present invention, and the Clearing Corporation debits/credits Member Firms' accounts accordingly. These data are also forwarded to the Member Firms' systems 116 so that they may update their customer accounts as well.

Figure 2:
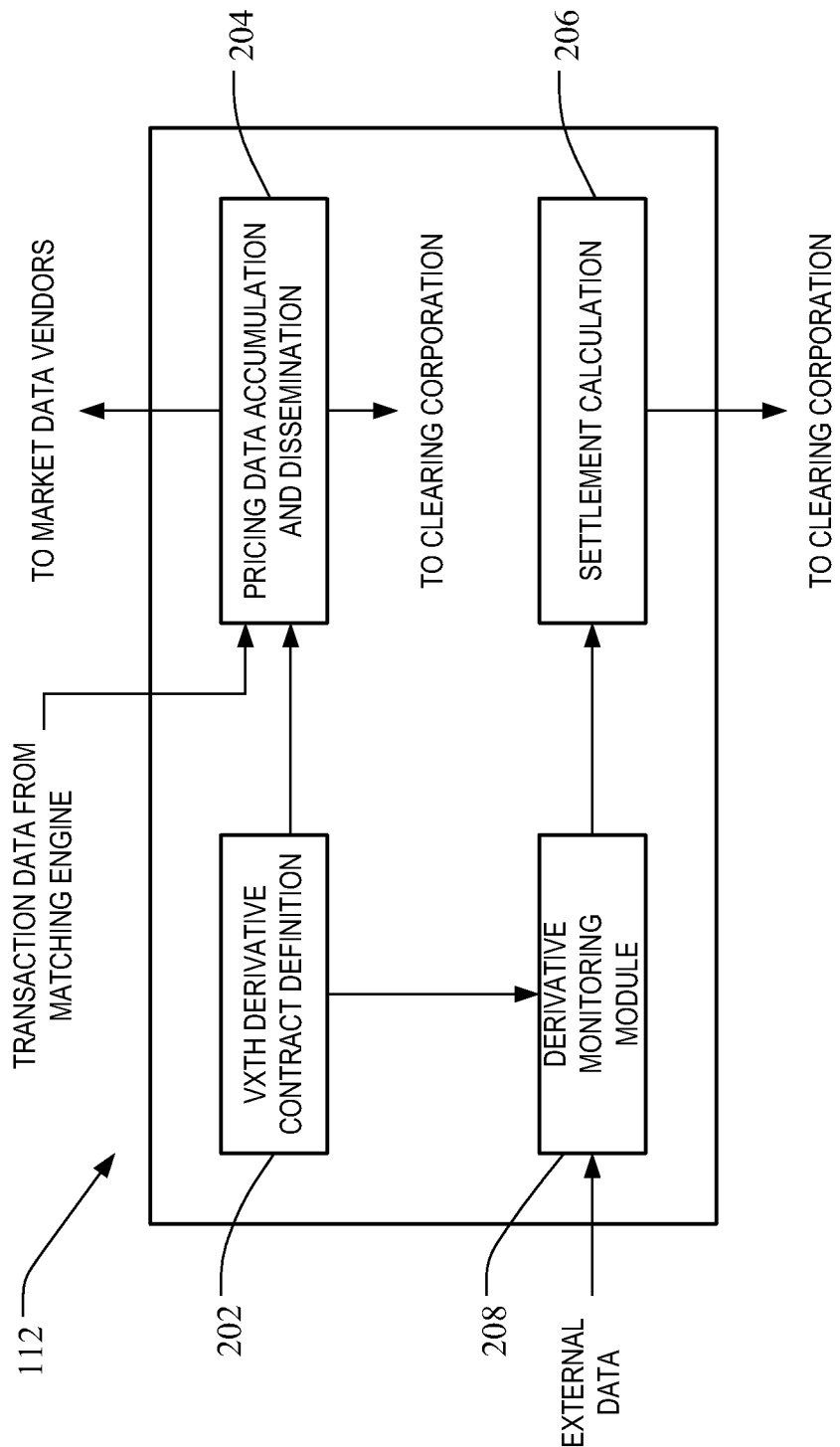
FIG. 2 is a diagram of a financial exchange's back end trading system.

FIG. 2 shows an embodiment of the exchange backend systems 112 used for creating and disseminating an index such as a volatility overlay index described below, and/or creating, listing, and trading derivative contracts that are based on such an index. A derivative contract based on the index has a definition stored in module 202 that contains all relevant data concerning the derivative contract to be traded on the trading platform 120, including, for example, the contract symbol, a definition of the underlying asset or assets associated with the derivative, or a term of a calculation period associated with the derivative. A pricing data accumulation and dissemination module 204 receives contract information from the derivative contract definition module 202 and transaction data from the matching engine 110. The pricing data accumulation and dissemination module 204 provides the market data regarding open bids and offers and recent transactions to the market data vendors 118. The pricing data accumulation and dissemination module 204 also forwards transaction data to the Clearing Corporation 114 so that the Clearing Corporation 114 may mark-to-market the accounts of Member Firms at the close of each trading day, taking into account current market prices for the derivative contracts of the present invention. Finally, a settlement calculation module 206 receives input from the derivative monitoring module 208. On the settlement date the settlement calculation module 206 calculates the settlement amount based on the value associated with the underlying asset or assets, here the value of a volatility overlay index as described below. The settlement calculation module 206 forwards the settlement amount to the Clearing Corporation 114, which performs a final mark-to-market on the Member Firms' accounts to settle the derivative contract of the present invention.

Figure 3:
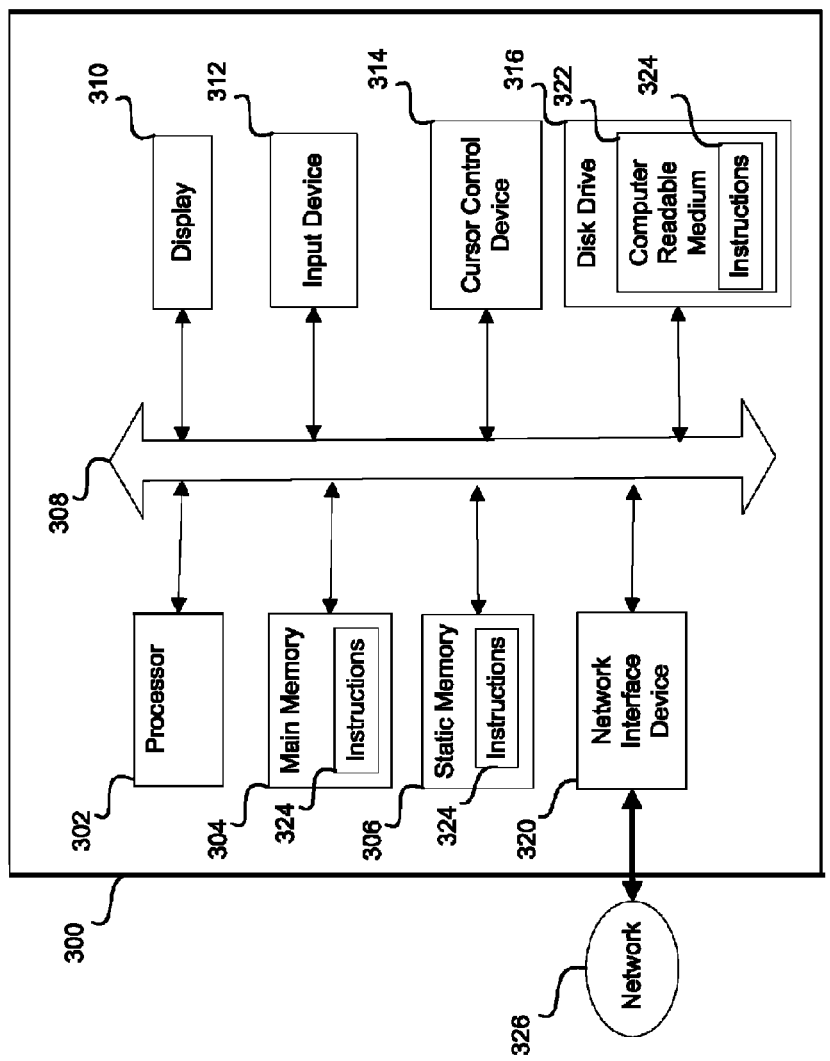
FIG. 3 is a diagram of a general purpose computer system that can be modified via computer hardware or software to be customized and specialized so as to be suitable for use in a financial exchanges computerized trading system.

Referring to FIG. 3, an illustrative embodiment of a general computer system that may be used for one or more of the components shown in FIG. 1, or in any other trading system configured to carry out the methods discussed in further detail below, is shown and is designated 300. The computer system 300 can include a set of instructions that can be executed to cause the computer system 300 to perform any one or more of the methods or computer based functions disclosed herein. The computer system 300 may operate as a standalone device, or may be connected using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 300 can also be implemented as or incorporated into various devices, such as a personal computer ("PC"), a tablet PC, a set-top box ("STB"), a personal digital assistant ("PDA"), a mobile device, a palmtop computer, a laptop computer, a desktop computer, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 302, such as a central processing unit ("CPU"), a graphics processing unit ("GPU"), or both. Moreover, the computer system 300 can include a main memory 304 and a static memory 306 that can communicate with each other via a bus 308. As shown, the computer system 300 may further include a video display unit 310, such as a liquid crystal display ("LCD"), an organic light emitting diode ("OLED"), a flat panel display, a solid state display, or a cathode ray tube ("CRT"). Additionally, the computer system 300 may include an input device 312, such as a keyboard, and a cursor control device 314, such as a mouse. The computer system 300 can also include a disk drive unit 316, a signal generation device 318, such as a speaker or remote control, and a network interface device 320.

In a particular embodiment, as depicted in FIG. 3, the disk drive unit 316 may include a computer-readable medium 322 in which one or more sets of instructions 324, such as software, can be embedded. Further, the instructions 324 may embody one or more of the methods or logic as described herein. In a particular embodiment, the instructions 324 may reside completely, or at least partially, within the main memory 304, the static memory 306, and/or within the processor 302 during execution by the computer system 300. The main memory 304 and the processor 302 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 324 or receives and executes instructions 324 responsive to a propagated signal, so that a device connected to a network 326 can communicate voice, video or data over the network 326. Further, the instructions 324 may be transmitted or received over the network 326 via the network interface device 320.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols commonly used by investment management companies, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Embodiments the methods disclosed herein can be implemented on existing financial exchange systems and/or other known financial industry systems. Both financial exchange systems and other known financial industry systems utilize a combination of computer hardware (e.g., client and server computers, which may include computer processors, memory, storage, input and output devices, and other known components of computer systems; electronic communication equipment, such as electronic communication lines, routers, switches, etc.; electronic information storage systems, such as network-attached storage and storage area networks) and computer software (i.e., the instructions that cause the computer hardware to function in a specific way) to achieve the desired system performance. It should be noted that financial exchange systems may be floor-based open outcry systems, pure electronic systems, or some combination of floor-based open outcry and pure electronic systems.

Utilizing one or more of the system architectures identified above, a method of creating an index, and of creating and trading derivatives based on that index, may be implemented. The index preferably provides a negative correlation to a particular market response for a given type of security. This feature may then be used to generate and trade a derivative instrument based on the index to allow investors to hedge an investment in the given type of security. One example of the index described herein is referred to generally as VIX overlay index because it tracks the performance of a hypothetical portfolio that combines either a VIX option or a portfolio of VIX options, using the OBOE Market Volatility Index or VIX®, and another asset. In other embodiments the index may consist of a VIX future, or portfolio of VIX futures, and another asset. Additionally, in other embodiments the volatility overlay may be a portfolio of any volatility futures or options or any combination thereof. Examples of the second asset may include an investment in the S&P 500 index, an investment in a money market instrument, or any other asset class (e.g. fixed income, treasuries, bonds, metals and so on). A particular VIX overlay index may be determined by the asset over which the VIX options are overlaid, the maturity (maturities) of the VIX options(s), the holding period(s) of the VIX option(s), and the weight(s) of the VIX option(s) in the hypothetical portfolio. Although a specific example of a VIX option and an investment in the S&P 500 are discussed in detail, a tail risk hedge index may be an index that measures the performance of a portfolio of calls for any of a number of indices, other than the OBOE Market Volatility Index or VIX®, and a second asset, where there is a large negative correlation between the call for the selected index and the second asset to big market moves.

One example of a VIX overlay index is the index that measures the performance of a portfolio composed of an investment in the S&P 500 combined with one-month 30 delta VIX calls. This specific example of the VIX overlay index, referred to as a tail risk hedge index (VXTH), tracks the performance of a hypothetical portfolio composed of an S&P 500 investment and 30-delta VIX calls available from the Chicago Board Options Exchange (OBOE). The portfolio is rolled monthly at the expiration of VIX options. VIX options expire on Wednesdays that precede SPX option expirations by 30 days. At 10:00 am on each roll date, old VIX options are deemed to expire, and new VIX options are purchased at the ask price. These options are then held until the next roll date. The VXTH is referred to as a "tail hedge" index because it is configured to provide a negative correlation to significant market drops, also referred to as tail risk.

Tail risk is a risk associated with an increase in a probability of outlier returns, returns that are two or more standard deviations below a mean. Outlier returns occur when there is a large sell off of shares by equity market participants that generates extreme downward moves in stock returns. When such a large sell off occurs, prices of stocks and stock indexes, such as the S&P 500®, and their returns are subject to large downward moves. The risk of such large downward moves is referred to as tail risk. Tail risk is typically negligible if the underlying asset has a normal distribution, but can be significant for distributions that are skewed and have fat tails. When a distribution of returns has a fat tail, there is an increased probability of extreme negative returns. As used herein, tail risk means the risk of a sudden and steep drop in market valuations, a downward move of 20% or more.

In one implementation, the percentage weight of the VIX calls in the hypothetical portfolio for VXTH may be varied at each roll based on Table 1 below:

TABLE 1

| F = One Month Forward Value of VIX | X = Portfolio Weight of VIX Calls |
|---|---|
| F <= 15% | 0% |
| 15% < F <= 30% | 1% |
| 30% < F <= 50% | ½% |
| F > 50% | 0% |

F is the forward volatility and is the expected price of VIX futures that will expire in the next month. The value for F may be obtained from the OBOE published VIX futures data. The number of VIX calls purchased is determined by fixing their percentage weight in the portfolio at X %. According to this scheme, if forward volatility is 16%, and a $1 million is invested in S&P500 stocks, $10,101 worth of VIX calls are purchased and half that amount if volatility is 45. The number (N) of VIX calls that correspond to a weight X % is determined by solving the equation:

$$\frac{100*N*C_{ask}}{S\&P500_{10} + 100*N*C_{ask}} = X \Rightarrow N = \frac{X}{1-X} * \frac{S\&P500_{10}}{100*C_{ask}}$$

Where $S\&P500_{10}$ is the value of the S&P 500 at 10:00 am Chicago time and $C_{ask}$ is the ask price of one-month VIX 30 delta calls. The number of VIX calls in the hypothetical portfolio tracked by the VXTH index then stays constant until the next expiration.

Once the hypothetical portfolio has been rebalanced at the roll date to account for the weight of any VIX calls, the value of the VXTH is obtained by compounding its value by its daily gross rate of return according to the relation:

$$VXTH_t = VXTH_{t-1} * (1 + R_{VXTH})$$

where $R_{VXTH}$ is the daily net rate of return of the index. On a non-roll date t, the closing value of VXTH is therefore equal to:

$$VXTH_t = VXTH_{t-1} * \frac{S\&P500_t + div_t + 100N_t * C_t^{mid}}{S\&P500_{t-1} + 100N_t * C_{t-1}^{mid}}$$

where S&P 500$_t$ is the value of the S&P 500 at the close of date t, div$_t$ is the amount of dividends expressed in index points paid at the open on date t, N$_t$ is the number of VIX calls in the portfolio, and C$_t^{mid}$ is the midquote of the calls at the close of date t.

On a roll date, the daily rate of return of the VXTH is compounded from the gross rate of return from the previous close to 10:00 a.m. when old VIX calls are deemed to expire and new one-month 30-delta VIX calls are purchased and the gross rate of return from 10:00 a.m. the open to the close according to the relation:

$$VXTH_t = VXTH_{t-1} * \frac{S\&P500_t + div_t + 100N_{old} * \max[0, SOQ - K_{old}]}{S\&P500_{t-1} + 100N_{old} * C_{t-1}^{mid}} * \frac{S\&P500_t + 100N_{new}C_t^{mid}}{S\&P500_{10} + 100N_{new}C_{ask}}$$

where N$_{old}$ is the number of expiring VIX calls, and N$_{new}$ is the number of new VIX calls purchased.

Figure 4:
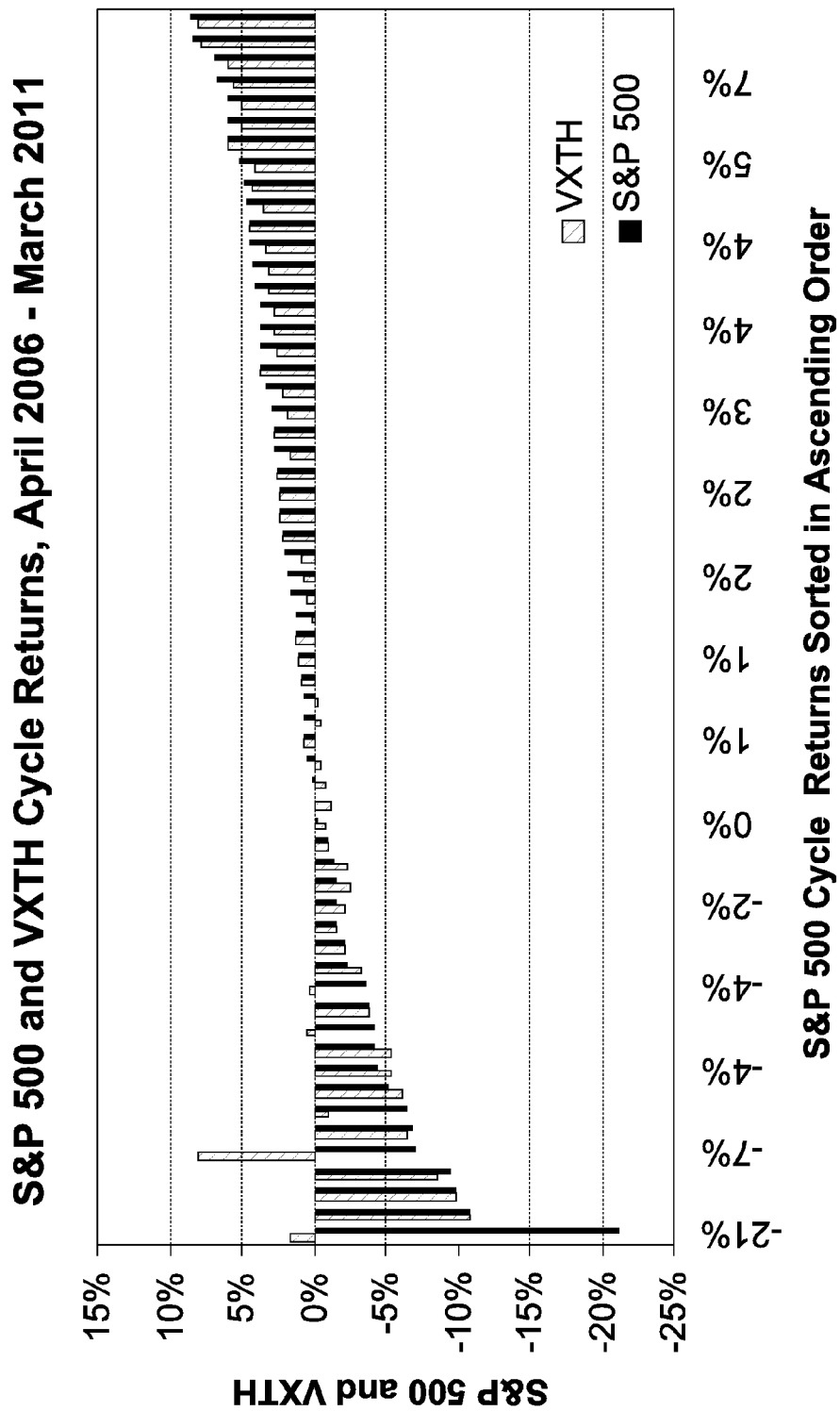
FIG. 4 is a chart indicating cycle returns of a proposed volatility overlay index against the S&P 500.

A transparent view of the performance of VXTH is the history of its rate of return over different cycles. A cycle begins when VIX calls are purchased and ends when they expire. FIG. 4 shows the cycle returns of the S&P 500 sorted in ascending order and the corresponding VXTH cycle returns that would hypothetically have resulted based on market data from April 2006 to March 2011.

Referring to FIG. 4, in October 2008, VXTH would have earned 1.61%, while the S&P 500 lost over 20%. This is the month when the tail hedge went to work. In other words, in that month the large positive return of the VIX call converted the large negative return of the S&P 500 into a positive return. The tradeoff was a cut in the rate of return in most non-crisis months. The average rate of the S&P 500 in these months was 0.66% and that of VXTH 0.60%. Hence the VXTH average monthly premium for tail risk insurance over this period would have been 0.06%. To add further perspective, based on historical data since 1986, the probability that the S&P 500 decreases by 20% or more over a month is 0.3%. A rough estimate of the expected return of the S&P 500 is therefore 0.59% (=0.003*(−0.2136)+0.997*0.0066) and that of VXTH 0.61%.

Figure 5:
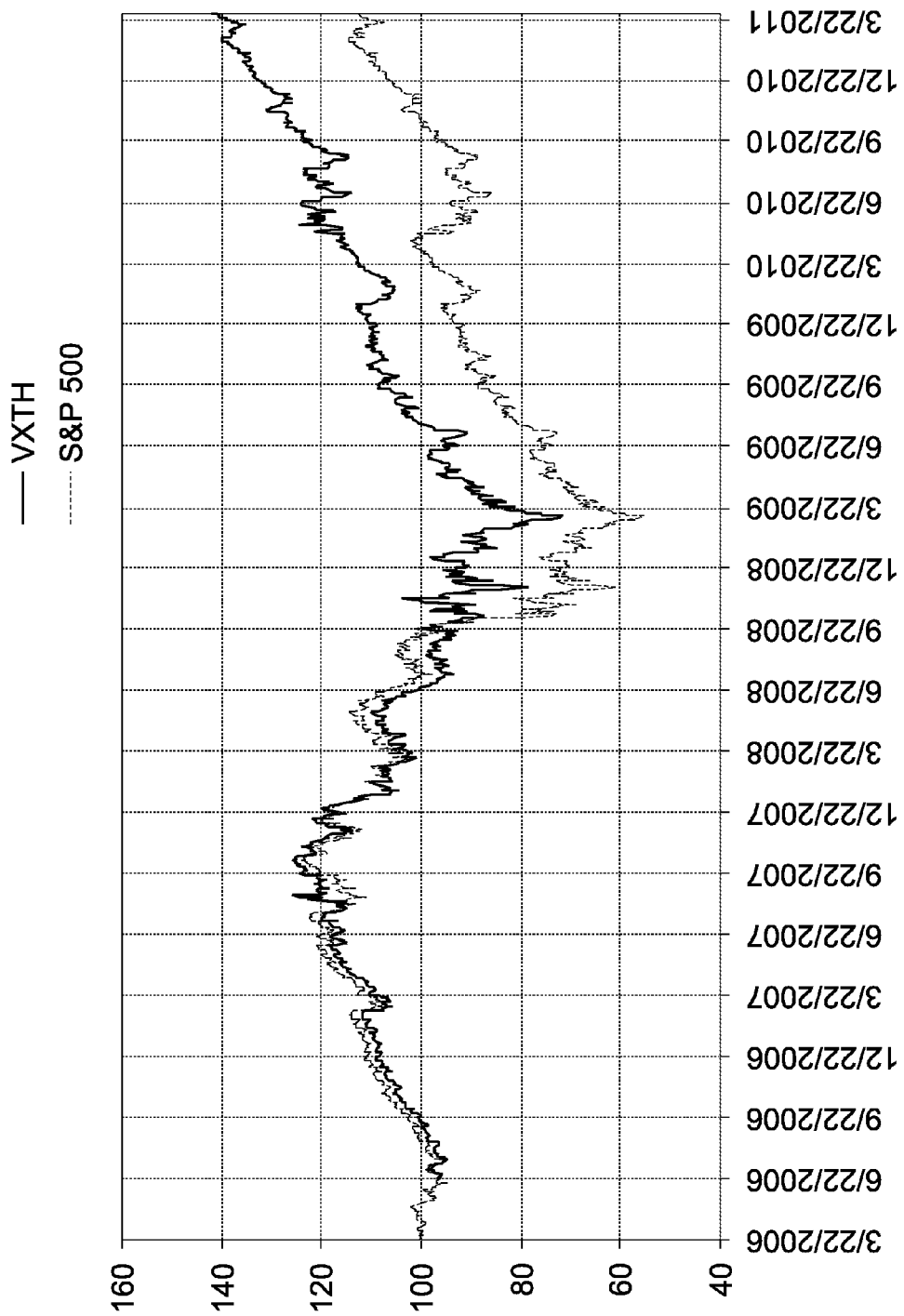
FIG. 5 is a chart indicating a relative performance of a proposed volatility overlay index against the S&P 500.

FIG. 5 is a graph of the value of VXTH from Mar. 22, 2006 to Mar. 31, 2011. The value of the S&P 500 Total Return Index is superimposed after rescaling it to 100 on Mar. 22, 2006. The two indexes stayed fairly close from 2006 to March 2008 because expected volatility was low and the portfolio weight of VIX calls corresponding small (0% or ½%) Starting in September 2008, when the credit crisis gathered steam, the weight of the VXTH would have gone up to 1%, and the pickup in volatility made the calls extremely profitable. This would allow the VXTH to surpass the S&P 500 as illustrated. By March 2011 the VXTH would still have maintained its edge over the S&P 500.

According to embodiments of the present invention, indices calculated according to the embodiments of the present invention may serve as the underlying asset for derivative contracts, such as options and futures contracts. More particularly, according to an embodiment of the present invention, a VXTH may serve as the underlying reference for derivative contracts designed for hedging against significant market drops, also referred to as tail risk. In particular, futures and options contracts with varying maturities based the index may be traded OTC and/or listed on exchanges.

Figure 6:
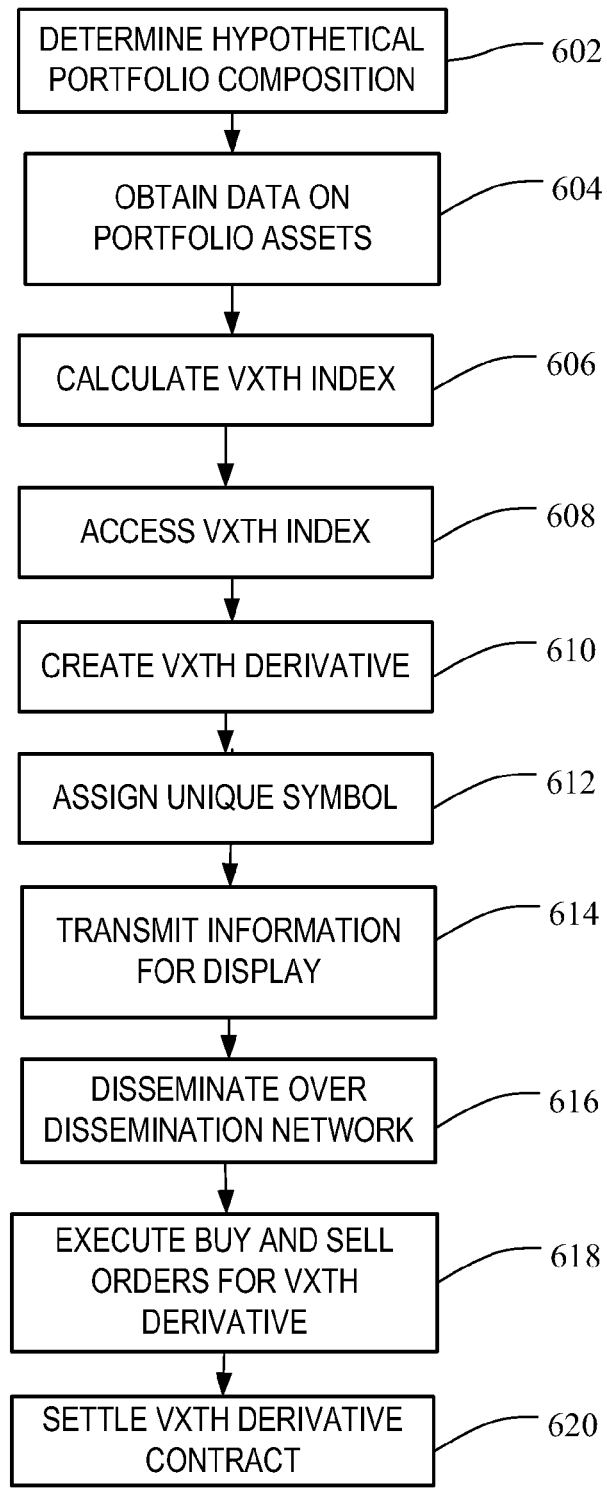
FIG. 6 is a flow diagram illustrating a method of creating a volatility overlay index and creating and trading a derivative based on that index.

Derivative instruments based on a volatility overlay index, such as the VXTH index disclosed above, may be created as standardized, exchange-traded contracts, as opposed to over-the-counter contracts. Referring to FIG. 6, a method for creating and trading a VXTH derivative contract begins by determining the composition of the hypothetical portfolio underlying the VXTH (at 602), obtaining data on the underlying assets (e.g., VIX derivative and S&P 500 asset) of the hypothetical portfolio underlying the VXTH (at 604) and calculating the VXTH index derivative contract (at 606). Once the VXTH index is calculated, the index may be accessed for use in creating a derivative contract, and the derivative contract may be assigned a unique symbol (at 608, 610, 612). Generally, the VXTH derivative contract may be assigned any unique symbol that serves as a standard identifier for the type of standardized VXTH derivative contract. Information associated with the VXTH and/or the VXTH derivative contract may be transmitted for display, such as transmitting information to list the VXTH index and/or the VXTH derivative on a trading platform (at 614). Examples of the types of information that may be transmitted for display include a settlement price of a VXTH derivative, a bid or offer associated with a VXTH derivative, a value of a VXTH index, and/or a value of the underlying hypothetical portfolio that a VXTH is associated with.

Generally, a VXTH derivative contract may be listed on an electronic platform, an open outcry platform, a hybrid environment that combines the electronic platform and open outcry platform, or any other type of platform known in the art. One example of a hybrid exchange environment is disclosed in U.S. Pat. No. 7,613,650, filed Apr. 24, 2003, the entirety of which is herein incorporated by reference. Additionally, a trading platform such as an exchange may transmit VXTH derivative contract quotes of liquidity providers over dissemination networks to other market participants (at 616). Liquidity providers may include Designated Primary Market Makers ("DPM"), market makers, locals, specialists, trading privilege holders, registered traders, members, or any other entity that may provide a trading platform with a quote for a variance derivative. Dissemination Networks may include networks such as the Options Price Reporting Authority ("OPRA"), the OBOE Futures Network, an Internet website or email alerts via email communication networks. Market participants may include liquidity providers, brokerage firms, normal investors, or any other entity that subscribes to a dissemination network.

The trading platform may execute buy and sell orders for the VXTH derivative (at 618) and may repeat the steps of calculating the VXTH of the underlying hypothetical portfolio, accessing the VXTH index, transmitting information for the VXTH index and/or the VXTH derivative for display (list the VXTH and/or VXTH derivative on a trading platform), disseminating the VXTH and/or the VXTH derivative over a dissemination network, and executing buy and sell orders for the VXTH derivative until the VXTH derivative contract is settled (at 620).

In some implementations, VXTH derivative contracts may be traded through an exchange-operated parimutuel auction and cash-settled based on the VXTH index of log returns of the underlying equity. An electronic parimutuel, or Dutch, auction system conducts periodic auctions, with all contracts that settle in-the-money funded by the premiums collected for those that settle out-of-the-money.

As mentioned, in a parimutuel auction, all the contracts that settle in-the-money are funded by those that settle out-of-the-money. Thus, the net exposure of the system is zero once the auction process is completed, and there is no accumulation of open interest over time. Additionally, the pricing of contracts in a parimutuel auction depends on relative demand: the more popular the strike, the greater its value. In other words, a parimutuel action does not depend on market makers to set a price. Instead, the price is continuously adjusted to reflect the stream of orders coming into the auction. Typically, as each order enters the system, it affects not only the price of the sought-after strike, but also affects all the other strikes available in that auction. In such a scenario, as the price rises for the more sought-after strikes, the system adjusts the prices downward for the less popular strikes. Further, the process does not require the matching of specific buy orders against specific sell orders, as in many traditional markets. Instead, all buy and sell orders enter a single pool of liquidity, and each order can provide liquidity for other orders at different strike prices and the liquidity is maintained such that system exposure remains zero. This format maximizes liquidity, a key feature when there is no tradable underlying instrument.

The following characteristics of futures contracts illustrate one embodiment of a futures contract having an index of the present invention as an underlying asset. The characteristics are not meant to limit the present invention, but rather to set forth common characteristics of futures:

Contract Size: The notional amount of one unit of the contract may be defined as a multiple of the index level, which may depend on the currency of the underlying index. When traded OTC, the multiplier may be negotiated between the parties involved on a trade-by-trade basis.

Contract Months: An exchange may list contracts with a pre-determined sequence of maturity dates, e.g. the 3rd Friday of each of the next 6 months. Similarly, OTC dealers may make markets in a pre-determined sequence of maturity dates but may also make markets for contracts that mature on other dates on a trade-by-trade basis.

Quotation & Minimum Price Intervals: Futures based on the index may be quoted in points and decimals or fractions that represent some notional amount per contract and there may be a minimum increment by which the pricing of the contracts may vary, both of which may depend on the currency of the underlying index. The OTC market may adopt different conventions for quoting and minimum ticks.

Last Trading Date: For each contract, a last trading date will be specified.

Final Settlement Date: For each contract, a final settlement date will be specified.

Final Settlement Value: The final settlement value shall be based on the level of the index computed at a pre-specified time on the settlement date.

Delivery: Settlement of futures based on the index will take the form of a delivery of the cash settlement amount and a payment date will be specified in relation to the final settlement date.

Additional Specifications when Exchange Traded: When traded on an exchange, trading platform, margin requirements, trading hours, order crossing rules, block trading rules, reporting rules, and other details may be specified.

The following characteristics of options contracts illustrate one embodiment of an options contract having an index of the present invention as an underlying asset. The characteristics are not meant to limit the present invention, but rather to set forth common characteristics of options:

Contract Size: The notional amount of one unit of the contract may be defined as a multiple of the index level, which may depend on the currency of the underlying index. When traded OTC, the multiplier may be negotiated between the parties involved on a trade-by-trade basis.

Contract Months: An exchange may list contracts with a pre-determined sequence of expiration dates, e.g. the 3rd Friday of each of the next 6 months. Similarly, OTC dealers may make markets in a pre-determined sequence of maturity dates but may also make markets for contracts that expire on other dates on a trade-by-trade basis.

Strike Prices: For each currency, strike prices that are in-, at-, and out-of the money may be listed by an exchange or quoted by OTC dealers and new strike prices may be traded as tail risks increase and decrease. An exchange or the OTC dealer community may fix a minimum increment between strike prices, depending on the currency of the underlying index.

Quotation & Minimum Price Intervals: Options based on the index may be quoted in points and decimals or fractions that represent some notional amount per contract and there may be a minimum increment by which the pricing of the contracts may vary, both of which may depend on the currency of the underlying index. The OTC market may adopt different conventions for quoting and minimum ticks.

Exercise Style: Options written on the VXTH are likely to be, but not limited to, European style. It is envisioned that American style contracts could also have an index of the present invention as an underlying asset Expiration Date: For each contract, an expiration date will be specified.

Last Trading Date: For each contract, a last trading date will be specified.

Settlement of Exercise: The final settlement value shall be based on the level of the index computed at a pre-specified time on the settlement date. The cash settlement amount will be the difference between the index level and the strike price, possibly adjusted by some multiplier, and a payment date will be specified in relation to the expiration date.

Additional Specifications when Exchange Traded: When traded on an exchange, trading platform, margin requirements, trading hours, reporting rules, and other details may be specified.

According to other embodiments of the present invention, other financial products that track or reference the indices of the present invention may be created. Such products include, but are not limited to, Exchange Traded Funds and Exchange Traded Notes listed on exchanges and structured products sold by financial institutions.

A volatility overlay index for addressing tail hedge needs, and derivative instruments based thereon, have been disclosed. It is intended that the foregoing detailed description be regarded as illustrative rather than limiting, and that it be understood that it is the following claims, including all equivalents, that are intended to define the spirit and scope of this invention.

The invention claimed is:

1. A computer-implemented method of calculating a tail risk hedge index associated with a portfolio having an underlying asset and a volatility index option based on the underlying asset, the method comprising:
    with a processor in a trading platform:
        retrieving instructions from a memory in the trading platform;
        receiving data relating to the underlying asset, and the volatility index option based on the underlying asset, for the portfolio;

based on the received data and using the retrieved instructions, calculating a tail risk hedge index (VXTH) associated with the portfolio having the underlying asset and the volatility index option based on the underlying asset; and transmitting the VXTH;

wherein the VXTH is calculated by the processor compounding its value based on an equation:

$$VXTH_t = VXTH_{t-1} * (1 + R_{VXTH})$$

where t is a close date and $R_{VXTH}$ is a daily net rate of return of the tail risk hedge index.

2. The computer-implemented method of claim 1, wherein the underlying asset of the portfolio is the S&P 500®.

3. The computer implemented method of claim 1, wherein the portfolio comprises a number N of volatility index derivatives, and wherein the processor determines N on a roll date of the volatility index derivatives according to:

$$N = \frac{X}{1-X} * \frac{S\&P500_{10}}{100 * C_{ask}}$$

where X is a percentage weight of the volatility index derivatives, $S\&P\ 500_{10}$ is a value of the S&P 500 at 10:00 am Chicago time and $C_{ask}$ is an ask price of the volatility index derivatives.

4. The computer-implemented method of claim 1, where, on a non-roll date t, the closing value of VXTH is calculated by the processor according to:

$$VXTH_t = VXTH_{t-1} * \frac{S\&P500_t + div_t + 100N_t * C_t^{mid}}{S\&P500_{t-1} + 100N_t * C_{t-1}^{mid}},$$

where $S\&P\ 500_t$ is a value of the S&P 500 at a close of date t, $div_t$ is an amount of dividends expressed in index points paid at an open on date t, $N_t$ is a number of volatility index (VIX) calls in the portfolio, and $C_t^{mid}$ is a midquote of calls at the close of date t.

5. The computer-implemented method of claim 1, where, on a roll date t, a closing value of VXTH is calculated by the processor according to:

$$VXTH_t = VXTH_{t-1} * \frac{S\&P500_t + div_t + 100N_{old} * \max[0, SOQ - K_{old}]}{S\&P500_{t-1} + 100N_{old} * C_{t-1}^{mid}} * \frac{S\&P500_t + 100N_{new}C_t^{mid}}{S\&P500_{10} + 100N_{new}C_{ask}}$$

where $S\&P\ 500_t$ is the value of the S&P 500 at the close of date t, $div_t$ is an amount of dividends expressed in index points paid at an open on date t, where $N_{old}$ is a number of expiring volatility index (VIX) calls, $N_{new}$ is a number of new VIX calls purchased, SOQ is a special opening quotation of the VIX to which VIX options settle, $K_{old}$ is a strike price of 30 delta VIX calls that are expiring, and $C_{ask}$ is an ask price of a new 30 delta VIX calls purchased, and $C_t^{mid}$ is a midquote of the calls at the close of date t.

6. The computer-implemented method of claim 1, further comprising:

transmitting the VXTH associated with the portfolio over a least one electronic dissemination network.

7. The computer-implemented method of claim 1, wherein the trading platform is an exchange server.

8. A trading platform comprising:

a transmission device;

a memory storing a set of instructions for calculating a tail risk hedge index (VXTH) associated with a portfolio of a volatility index derivative and an underlying asset; and a processor in communication with the transmission device and the memory, the processor configured to retrieve and execute the set of instructions stored in the memory and to:

receive data relating to the underlying asset, and the volatility index option based on the underlying asset, for the portfolio;

based on the received data and using the retrieved instructions calculate the VXTH associated with the portfolio; and transmit the VXTH associated with the portfolio from the transmission device;

wherein the VXTH is calculated by the processor compounding its value based on an equation:

$$VXTH_t = VXTH_{t-1} * (1 + R_{VXTH})$$

where t is a close date and $R_{VXTH}$ is a daily net rate of return of VXTH.

9. The trading platform of claim 8, wherein the portfolio comprises a number N of volatility index derivatives, and wherein the processor is configured to determine N on a roll date of the volatility index derivatives according to:

$$N = \frac{X}{1-X} * \frac{S\&P500_{10}}{100 * C_{ask}}$$

where X is a percentage weight of the volatility index derivatives, $S\&P\ 500_{10}$ is a value of the S&P 500 at 10:00 am Chicago time and $C_{ask}$ is an ask price of the volatility index derivatives.

10. The trading platform of claim 9, where the processor is configured to calculate, on a non-roll date t, a closing value of VXTH according to:

$$VXTH_t = VXTH_{t-1} * \frac{S\&P500_t + div_t + 100N_t * C_t^{mid}}{S\&P500_{t-1} + 100N_t * C_{t-1}^{mid}}$$

where $S\&P\ 500_t$ is a value of the S&P 500 at a close of date t, $div_t$ is an amount of dividends expressed in index points paid at an open on date t, $N_t$ is a number of volatility index (VIX) calls in the portfolio, and $C_t^{mid}$ is a midquote of the VIX calls at the close of date t.

11. The trading platform of claim 10, where the processor is configured to calculate, on a roll date t, the closing value of VXTH according to:

$$VXTH_t = VXTH_{t-1} * \frac{S\&P500_t + div_t + 100N_{old} * \max[0, SOQ - K_{old}]}{S\&P500_{t-1} + 100N_{old} * C_{t-1}^{mid}} * \frac{S\&P500_t + 100N_{new}C_t^{mid}}{S\&P500_{10} + 100N_{new}C_{ask}}$$

where $S\&P\ 500_t$ is the value of the S&P 500 at the close of date t, $div_t$ is the amount of dividends expressed in index points paid at the open on date t, where $N_{old}$ is a number of expiring VIX calls, $N_{new}$ is a number of new VIX calls purchased, SOQ is a special opening quotation of the VIX to which VIX options settle, $K_{old}$ is a strike price of a 30 delta VIX calls that are expiring, and $C_{ask}$ is an ask price of new 30 delta VIX calls purchased, and $C_t^{mid}$ is the midquote of the calls at the close of date t.

12. A computer-implemented method of creating a tail risk hedge index derivative, the method comprising:
   a processor of an exchange computer executing a set of instructions retrieved from memory for accessing a tail risk hedge index associated with a portfolio of an underlying asset and a volatility index derivative;
   creating, with the processor, a tail risk hedge index derivative based on the tail risk hedge index; and
   transmitting, with the processor, information associated with the tail risk hedge index derivative for display.

13. The computer-implemented method of claim 12, wherein the portfolio comprises a number N of volatility index derivatives, and wherein the processor determines N on a roll date of the volatility index derivatives according to:

$$N = \frac{X}{1-X} * \frac{S\&P500_{10}}{100 * C_{ask}}$$

where X is a percentage weight of the volatility index derivatives, $S\&P500_{10}$ is a value of the S&P 500 at 10:00 am Chicago time and $C_{ask}$ is an ask price of the volatility index derivatives.

14. The computer-implemented method of claim 13, wherein the tail risk hedge index comprises an index (VXTH) based on a portfolio of a volatility index (VIX) call and an S&P 500 asset, and on a non-roll date t, the processor calculates a closing value of VXTH according to:

$$VXTH_t = VXTH_{t-1} * \frac{S\&P500_t + div_t + 100N_t * C_t^{mid}}{S\&P500_{t-1} + 100N_t * C_{t-1}^{mid}}$$

where $S\&P500_t$ is a value of the S&P 500 at a close of date t, $div_t$ is an amount of dividends expressed in index points paid at an open on date t, $N_t$ is a number of VIX calls in the portfolio, and $C_t^{mid}$ is a midquote of the calls at the close of date t.

15. The computer-implemented method of claim 14, where, on a roll date t, the processor calculates the closing value of VXTH according to the equation:

$$VXTH_t = VXTH_{t-1} * \frac{S\&P500_t + div_t + 100N_{old} * \max[0, SOQ - K_{old}]}{S\&P500_{t-1} + 100N_{old} * C_{t-1}^{mid}} * \frac{S\&P500_t + 100N_{new}C_t^{mid}}{S\&P500_{10} + 100N_{new}C_{ask}}$$

where $S\&P500_t$ is the value of the S&P 500 at the close of date t, $div_t$ is the amount of dividends expressed in index points paid at the open on date t, where Nold is a number of expiring VIX calls, $N_{new}$ is a number of new VIX calls purchased, SOQ is a special opening quotation of the VIX to which VIX options settle, $K_{old}$ is a strike price of 30 delta VIX calls that are expiring, and $C_{ask}$ is an ask price of the new 30 delta VIX calls purchased, and $C_t^{mid}$ is the midquote of the calls at the close of date t.

16. The computer-implemented method of claim 12, wherein the VXTH derivative is a VXTH option contact.

17. The computer-implemented method of claim 12, wherein the underlying asset of the portfolio is the S&P 500®.

18. The computer-implemented method of claim 12, wherein the tail risk hedge index derivative is a VXTH futures contract.

19. The computer-implemented method of claim 12, further comprising:
   executing trades with the processor of the exchange computer for the VXTH derivative by matching bids and offers to buy and sell positions in the VXTH derivative received at the processor.

* * * * *